United States Patent [19]
Sewell et al.

[11] Patent Number: 5,316,741
[45] Date of Patent: May 31, 1994

[54] OZONE GENERATOR

[75] Inventors: Peter B. Sewell, Woodlawn; Richard J. Luscombe-Mills, Portland, both of Canada

[73] Assignee: Zontec Inc., Prescott, Canada

[21] Appl. No.: 707,818

[22] Filed: May 30, 1991

[51] Int. Cl.$^5$ ............................................ B01J 11/12
[52] U.S. Cl. ............................ 422/186.21; 422/186.07
[58] Field of Search ..................... 422/186.07, 186.15, 422/186.21

[56] References Cited

U.S. PATENT DOCUMENTS

| 3,308,050 | 3/1967 | Denis | 422/186.07 |
| 4,507,266 | 3/1985 | Satoh et al. | 422/186.15 |
| 4,886,645 | 12/1989 | Fischer et al. | 422/186.18 |
| 5,034,198 | 7/1991 | Kaiga et al. | 422/186.07 |

FOREIGN PATENT DOCUMENTS

| 935784 | 10/1973 | Canada . |
| 9111395 | 8/1991 | PCT Int'l Appl. . |
| 472218 | 5/1969 | Switzerland . |

Primary Examiner—Donald P. Walsh
Assistant Examiner—Daniel Jenkins
Attorney, Agent, or Firm—Dressler, Goldsmith, Shore & Milnamow, Ltd.

[57] ABSTRACT

The apparatus described is intended for the treatment of small volumes of room air for the removal of odors. Since the ozone output of the apparatus is calibrated in terms of the readily measured corona current, this type of apparatus can be intelligently applied to odor control problems. If the volume to be treated is known, then the output in mg/hr necessary to produce ozone backgrounds of 0.04 ppm and below can be readily computed. Such concentrations are comparable to the natural background and generally acceptable for continuous human occupation.

11 Claims, 6 Drawing Sheets

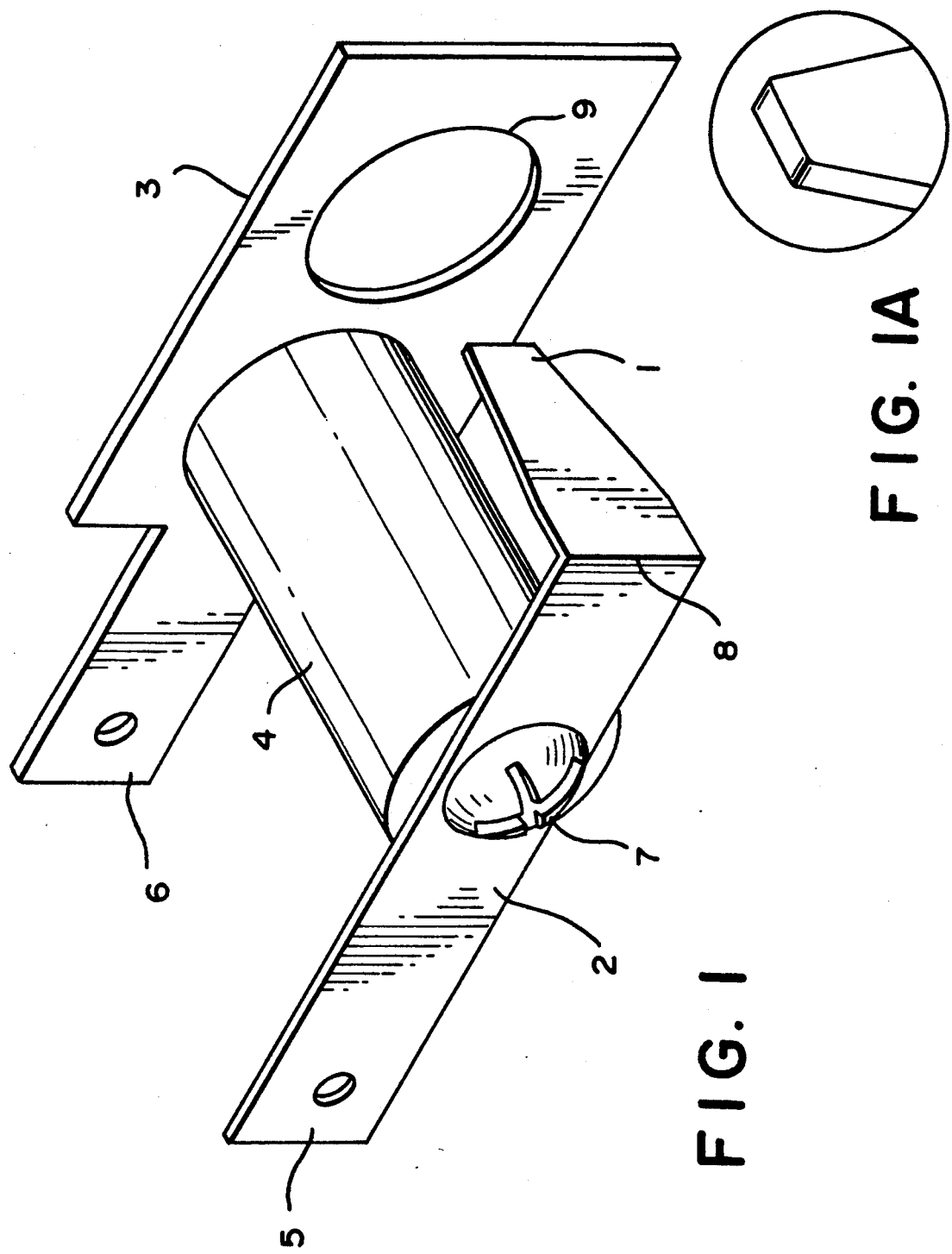

FIG. 3A
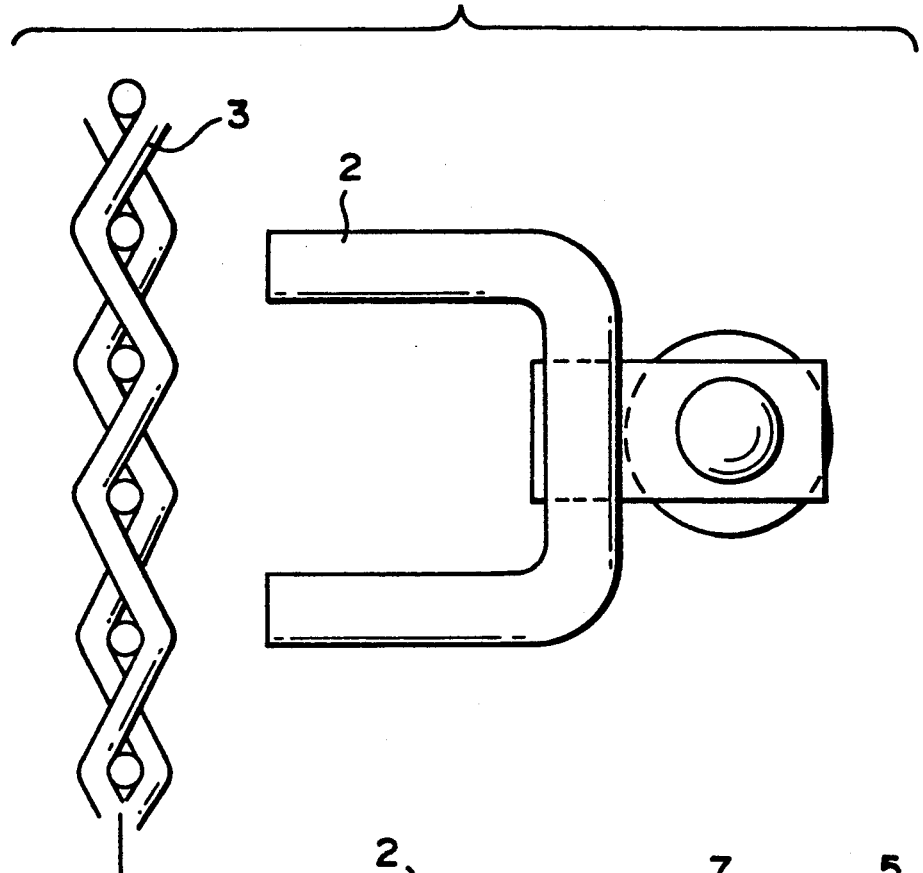
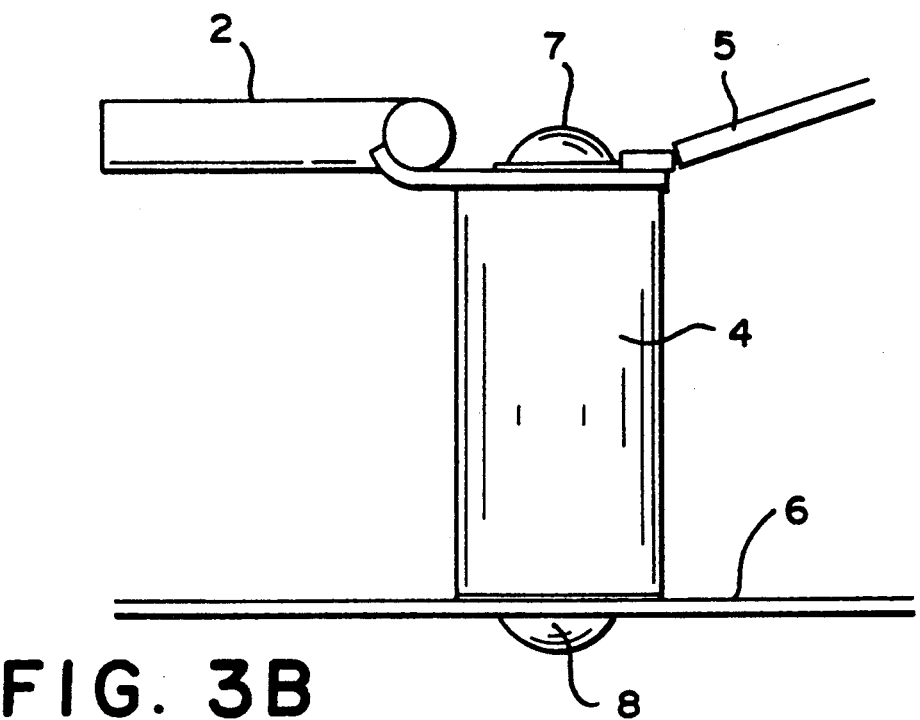
FIG. 3B

OZONE GENERATOR

BACKGROUND OF THE INVENTION

This invention relates to ozone generators and in particular to ozone generators for producing small quantities of ozone from air. The ozone generators can be used to reduce or eliminate odours in, for example, public washrooms although other uses are contemplated such as in kitchens, coolers, etc. In the ozone generators disclosed herein the initiation of a corona discharge and the resulting ion wind from the corona are sufficient to displace air through the apparatus for the continuous production of both ions and ozone.

The production of ozone in a direct current corona has been investigated by numerous researchers. The basic mechanisms of the direct current corona have been documented by L. B. Loeb in two texts, viz. "Basic Processes of Gaseous Electronics", University of California Press, Berkeley and Los Angeles, 1955 (Second Edition 1961) and "Electrical Coronas—Their Basic Physical Mechanisms", University of California Press, Berkeley and Los Angeles, 1965. However, the quantitative evaluation of ozone production in coronas is not discussed in either of these references. The ozone production from pointed electrodes and wire electrodes have been reported in the literature (Goldman M., Lecuiller M. and Palierne M., Gaseous Discharges III, Pergamon Press, 1982 p 329; Peyrous R. and Lacase C, Ozone Science and Engineering 8, pp 107–128, 1986). In much of this work there is general disagreement about the efficiency of ozone production in positive or negative coronas, and the role of electrode materials in improving ozone production by catalytic processes. The production of ozone in large quantities by corona discharges using a primary and secondary corona process in confined tubulation with forced air flow, has been described in U.S. Pat. No. 4,062,748. This apparatus requires the forced circulation of air or oxygen through tubular arrays, to ozone outputs at the level of grams per hour. Canadian Patent No. 935,784 of Corbeil, issued Oct. 23, 1973 describes a gas treatment apparatus in which ozone is produced by a direct current corona between a sharp point and a section of spherical gauze as the counter electrode. The device is enclosed in a tube of insulating material and disperses ozone with the aid of the associated ion wind. No measurements or estimates of the amount of ozone produced are included in the patent.

From the work of Loeb, it is clear that in the silent DC corona there can be marked differences in the effective temperature of the corona, depending on the local current density in the discharge. As the corona degenerates to an arc, this temperature further increases. It is known that in this arc mode, the production of ozone is small, as ozone produced by dissociation of oxygen by ion impact, is quickly reverted to oxygen at the elevated temperature of the arc. Even in silent corona discharges it is important to control the local temperature in the discharge, so that ozone is not rapidly converted to oxygen after initial formation. As a result, the discharge from sharp points is to be avoided if the ozone is to be produced efficiently in low current corona discharges.

U.S. Pat. No. 4,507,266 of Satoh, et al, issued Mar. 26, 1985, discloses an electrode structure having a plurality of edges. Glow discharge is generated between edge portions 4a, 4b of the projected portions 4 on the surface of the cathode 2 and the anode 3.

Canadian patent No. 920,088 of Beitzel, issued Jan. 30, 1973, discloses a tubular electrode structure for an ozone generator including a dielectric tube 12 with an electrode 14 on the inner surface of the tube and an electrode 16 on the outer surface of the tube.

Many types of ozone generators are known in the art. For example, ozone generators having plate type electrodes are disclosed in Canadian patent No. 920,979 of Schaefer, issued Feb. 13, 1973 and in Canadian Patent No. 1,090,293 of Pavel, issued Nov. 25, 1980.

SUMMARY OF THE INVENTION

An object of the present invention is to provide a simple but effective ozone generator for producing small quantities of ozone from air, which ozone generator can be used to reduce or eliminate odours in, for example, public washrooms or in kitchens, coolers, etc. For the sake of simplicity, the ozone generator is to be operable without a fan to move the ozone, although a fan could be used if desired. A number of electrode structures are disclosed hereinafter which generate an "ion wind" without the aid of fans.

In addition, in the present invention, the stability of the discharge is improved by control of the waveform of the voltage applied to the active electrode. If a high constant DC voltage is applied to a pointed electrode and a high local current initiated, the discharge can rapidly degenerate from the true corona to the arc or spark mode. In this mode, ozone production is low, even if the total current is high. To avoid this, the waveform of the applied voltage can be controlled, with the initiation of the discharge at a high voltage and the subsequent sustainment of the corona at a lower voltage for a controlled period of time. This cycle is repeated at regular intervals, to sustain a high average DC current for the individual discharge electrode. If the frequency of this process is maintained above about 20 kHz, then the noise produced by the initiation and collapse of the corona, is above that of normal human auditory response, so that the corona is essentially silent.

The above features have been incorporated into a small corona generator whose measured ozone output is a function of the average DC current, in either the positive or negative corona mode. For the treatment of air space that will see human occupation, the use of a negative corona is selected as excess positive ions are considered to be detrimental for the well being of humans in certain circumstances. Known amounts of ozone are also required from any apparatus to be used for the treatment of room air, as the residual ozone concentration in the room can only be computed from both the rate of production and the rate of decay in the environment being treated. Ozone production in well calibrated amounts is thus required from instrumentation to be used for such applications.

It is also an object of the invention to provide a known amount of ozone in mg/hour for the treatment of air in small rooms, e.g. rooms of volumes up to about 2000 cubic feet. The device provides a consistent production of ozone by a direct current negative or positive corona produced by a high frequency pulsed DC power supply which controls the waveform to the active corona electrode. Ozone is distributed to the environment by the ion wind produced by the device.

In order to achieve the above, two basic forms of the ozone generator have been developed. Both incorporate features which avoid the use of a single sharp point for the active electrode, so as to maximize ozone production by restricting the effective temperature of the corona. In addition the active electrode is made from a material that resists corrosion and ion ablation so that current in the corona and ozone production, is constant for long periods of time. The ozone concentration in the ion wind from the device falls off rapidly so that the concentration of ozone at a distance of some 20 cm from counter electrode is below 0.04 ppm.

According to a broad aspect of the invention there is provided an electrode structure for an ozone generator comprising an active electrode and a counter electrode, said electrodes each having terminal portions for connection to a high voltage DC source, said electrodes being mounted in spaced apart relation and insulated from one another, said active electrode having a tip portion with a blunt end face disposed at a predetermined distance from said counter electrode and in axial alignment with at least one aperture in said counter electrode, the shape of said end face and its distance from said counter electrode being selected to minimize corona temperature in the immediate vicinity of the electrode and thus maximize the production of ozone at a specific corona current.

BRIEF DESCRIPTION OF THE DRAWINGS

FIG. 1 is an isometric view of an electrode structure according to a first embodiment of the invention, FIG. 1A is a detail view of part of one of the electrodes of FIG. 1, FIGS. 2A and 2B are plan and elevation views, respectively, of an electrode structure according to a second embodiment of the invention, FIGS. 3A and 3B are plan and elevation views, respectively, of an electrode structure according to a third embodiment of the invention.

DESCRIPTION OF THE PREFERRED EMBODIMENTS

Figure 2A:
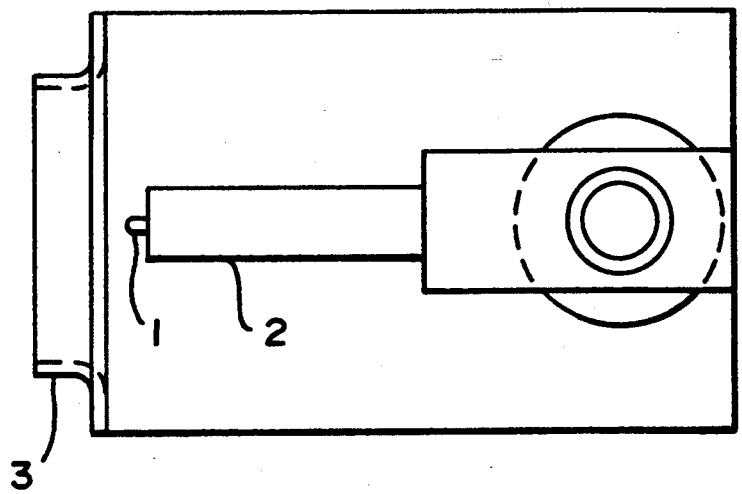

In the figures, reference numeral 1 denotes the tip region of the active electrode at which the corona is concentrated and in the vicinity of which the major portion of the ozone is produced; 2 denotes the main body of the active electrode, 3 the counter electrode towards which the corona is directed and which is generally at earth potential. Numeral 4 denotes the insulator separating the active and counter electrode being generally porcelain or ceramic although it could also be of plastic composition. The numerical 5 indicates the position of the high voltage connector on the active electrode and 6 the connector of the counter electrode 3. 7 and 8 indicate support screws or rivets for the active and counter electrodes respectively.

From FIGS. 1 and 1A, it is seen that the active portion 1 of the corona electrode is actually two corners of a flat strip electrode 2 having a right-angle bend 8. The width of the electrode tip 1 and the radius of the corners, distribute the discharge over an area of about 0.002 cm$^2$ so that for a corona current of 100 $\mu$A the local current density at the tip is about $5 \times 10^{-2}$ A/cm$^2$. At this level of tip current density it is found that the ozone production for this type of generator is most efficient. For sharper points and the same current, the corona temperature results in less ozone being available in the ion wind generated by the apparatus. The electric field between the active electrode tip 1 and the counter electrode 3 is sufficient to initiate a corona current of a few micro-amperes at applied voltages of about 5 kilovolts and the apparatus can produce corona currents of up to 150 micro-amperes at voltages of some 9 to 10 kilo-volts without the discharge degenerating into an arc. A satisfactory configuration of this structure uses an aperture of 12 to 14 mm diameter and a set back of the active electrode 1 from electrode 3 of between 6 to 7 mm on the axis normal to the aperture 9.

The corona electrode 2 is made of a material that is resistant to oxidation by ozone and also resistant to ionic ablation resulting from the impact of high energy ions from the discharge onto the surface of the electrode. Materials such as titanium, stainless steel and gold have been found most suitable for the active corona electrode of the devices indicated in FIGS. 1-4. The counter electrode 3 must also be resistant to oxidation by ozone in the corona wind that passes across this and again titanium and stainless steel have been found to be most satisfactory for this electrode.

Figure 2B:
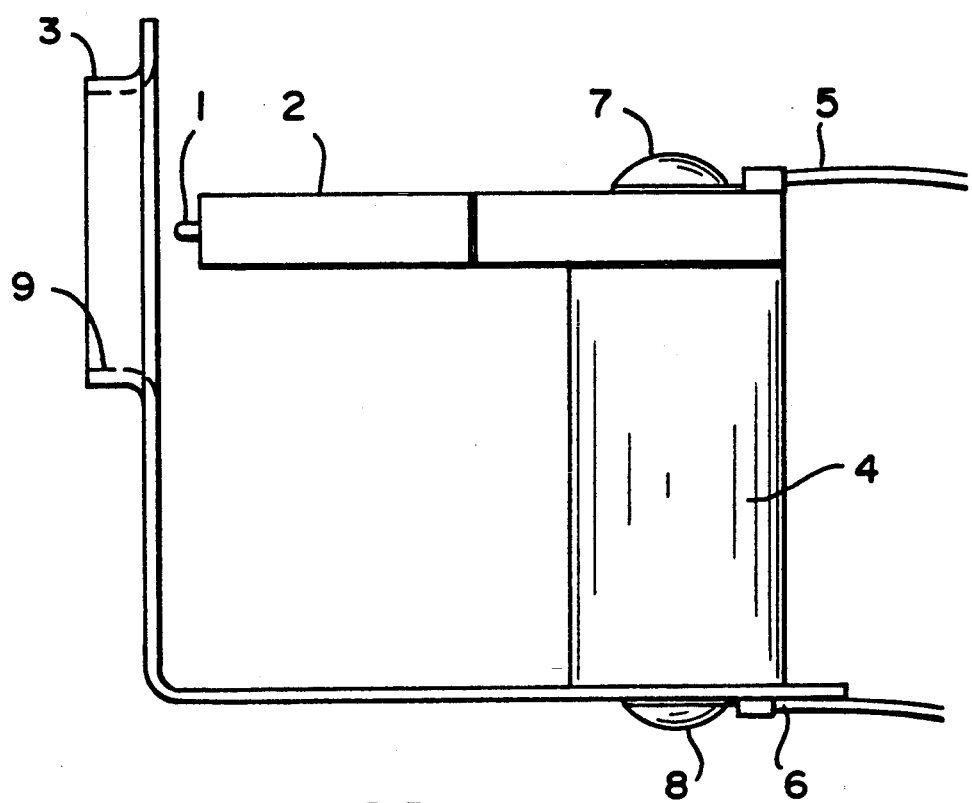

Various embodiments of the basic apparatus are shown in FIGS. 2A, 2B; 3A, 3B and 4. In FIGS. 2A, 2B, the active electrode 2 has a wire tip 1, which is not sharp, but of small radius of curvature, having a radius of about 0.1 to 0.2 mm. It is located on the axis of an aperture 9 in the counter electrode 3 such that the distance from the adjacent plane of the aperture is about one half of the aperture diameter. This apparatus can be in a planar electrode, as shown for the apparatus of FIGS. 1 and 2, or be formed to a section of a cylinder as shown in FIGS. 2A, 2B. The active electrode and the counter electrode are mounted on a suitable insulator 4, which serves to provide electrical insulation and appropriate physical location of the electrodes.

A similar embodiment is shown in FIGS. 3A, 3B, where the surface area of the discharge from the active electrode is increased by the use of two ends of a U-shaped rod electrode 2 of about 1 to 3 mm diameter. This active electrode is separated from an open screen form of counter electrode 3. The separation is sufficient to maintain a silent corona without arcing, and the screen allows the passages of ions and ozone from the apparatus to the surrounding regions.

Figure 4:
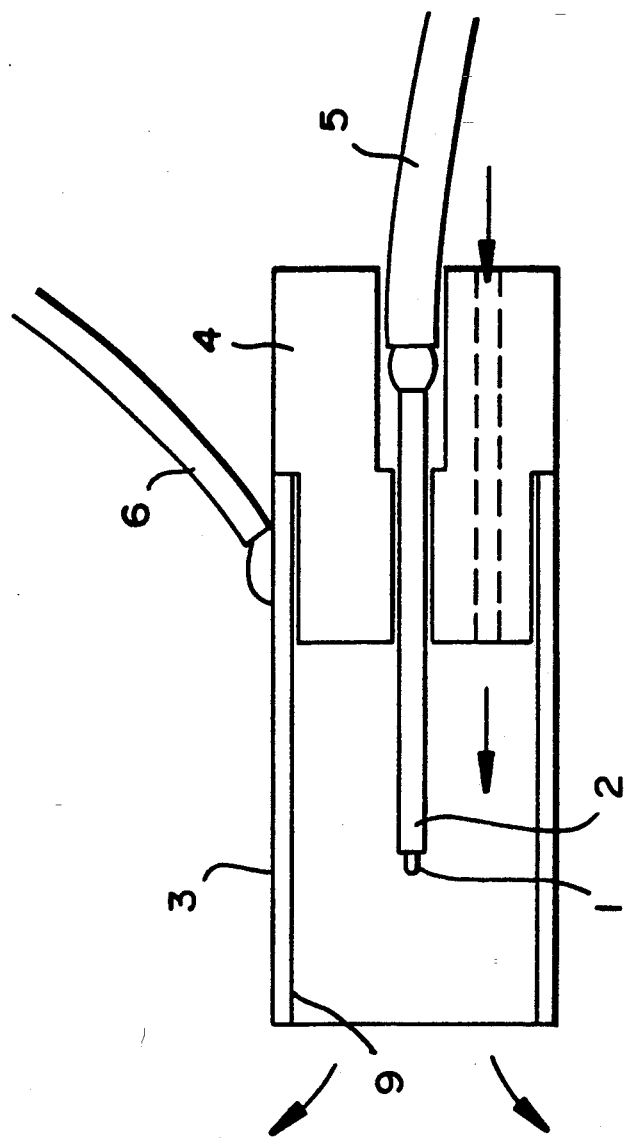
FIG. 4 is a plan view of a cylindrically symmetric embodiment of an electrode structure according to the invention.

An embodiment of the invention in a cylindrical form is shown in FIG. 4. Here the active end 1 of the corona electrode 2 is a wire tip of radius about 0.1 to 0.2 mm. The tip is set on the axis of a cylindrical counter electrode 3 and separated and insulated from it by a tubular insulator 4. The tip of the active electrode 1 is set back from the end aperture of the counter electrode 3 by about one half of the diameter of the tube. With a tube of 14 mm inner diameter this device is stable with applied voltage of 8.5 kilo-volts mean voltage and can produce ozone at a rate of 10 mg/hour with a current of about 120 $\mu$A in dry air. The most effective tip material for this apparatus has been found to be pure gold. A short length of gold wire is fitted into the end of a more massive electrode as shown in the figure. Other electrode materials such as stainless steel are also satisfactory. The corona wind containing ions and ozone generated by this apparatus is generated from air drawn either from the outer circumference of the open end of the counter electrode tube or from air that is allowed to pass through holes in the insulator 4, as shown in FIG. 4.

Figure 5:
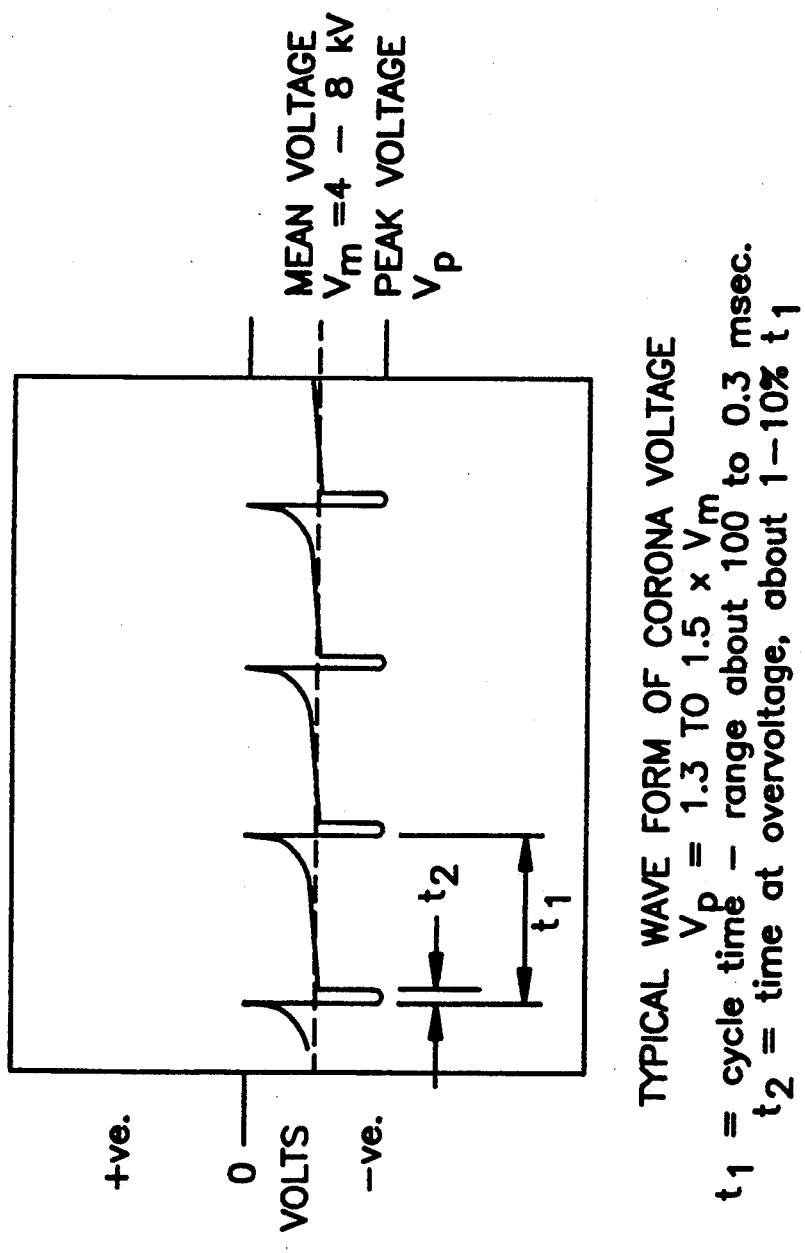
FIG. 5 is a diagram showing a typical waveform of electrical potential applied to the active electrode of an ozone generator as shown in FIGS. 1-4.

All the configurations of the ozone generator produce ozone effectively with applied voltages to the active electrode 1, 2 being either positive or negative and between 3.5 and 9 kilovolts DC. However, to maintain a stable corona it has been found that the waveform of the applied voltage should be controlled in a manner similar to that indicated in FIG. 5. Here a pulsed DC waveform applied to the active electrode at time $t_1$ serves to initiate the corona current by field ionization of the air. The voltage is then rapidly reduced to a lower level at time $t_2$ and maintained at this level for a longer period of time such that the mean voltage measured is close to the value at time $t_2$. At this lower voltage the corona current is maintained and the possibility of degeneration to an arc discharge is reduced. The voltage is then reduced to zero and the discharge extinguished. This cycle is repeated at a high frequency with the total time of the cycle $t_1$ being in the range of 1 msec to 0.02 msec (a frequency range of 1000 to 50000 Hz) and the time for the initial overvoltage at time $t_1$ being about 1 to 10% of the period $t_1$.

A waveform of this type with either positive or negative voltages is found to produce ozone with reasonable efficiency. With the configurations described the production is maximum for the mean negative DC voltage. Ozone can be produced at frequencies other than the range above or with a steady DC voltage, but at a lower efficiency. The preferred mode of operation of the apparatus is with a negative pulsed DC voltage applied to the active electrode. With this arrangement ozone output is a linear function of the mean corona current, this being recorded from a typical configuration of the cell described in FIGS. 1 and 2 with a 14 mm aperture and an active electrode set back of 7 mm. Voltages between 5.0 and 9 kilo-volts were required to produce the corona currents.

As negative ions are predetermined in a corona initiated with a negative DC voltage applied to electrode 1, this is preferred as a device operating with a positive DC voltage and producing excess positive ions into the atmosphere can be regarded as undesirable. Considerable literature is available on possible health consequences of excess positive ions in the atmosphere.

The ozone produced by the apparatus shown in FIGS. 1 to 4 is dispersed into the local environment by virtue of the ion wind produced by the corona. This effect is well known and a plume of ozone distribution is expected, with its axis of maximum concentration located on the geometrical axis of the ozone generator. As a result of the ion wind, the concentration of ozone along the geometric axis normal to the output or counter electrode should decrease as ozone is dispersed and diffuses into the surroundings. The ozone concentration drops to about 0.04 ppm at a distance of about 20 cm from the output of the apparatus.

The electrode structure of FIG. 1 is contained in an insulating housing, not shown, from which extend the terminal portions 5, 6 which can be plugged into mating sockets of the high voltage DC power supply. The housing also has an opening in alignment with hole 3, but may be covered with a protective grill or screen.

The act of plugging the generator module into the mating socket of the power supply activates the high voltage power supply for the ozone generator by means of insulated switches, not shown. The high voltage of the unit is only applied when the generator is plugged into the power supply. If desired, the generator can be locked in position with suitable locating screws or fittings.

The high voltage power supply is deactivated by the action of removing the ozone generator module (electrode structure and housing) from the power supply unit, following the removal of the retaining fittings and withdrawal of the module from its connector sockets.

Sensor control can be incorporated into the unit so that the generation of ozone ceases when the sensor is activated by the presence of persons or by their movement in the enclosure or room containing the ozone generator unit. This can provide an additional safety feature by limiting the background ozone concentration in the room during occupation. As the half-life of ozone is only some 7 minutes, background levels decay quickly when the unit is deactivated.

Figure 6:
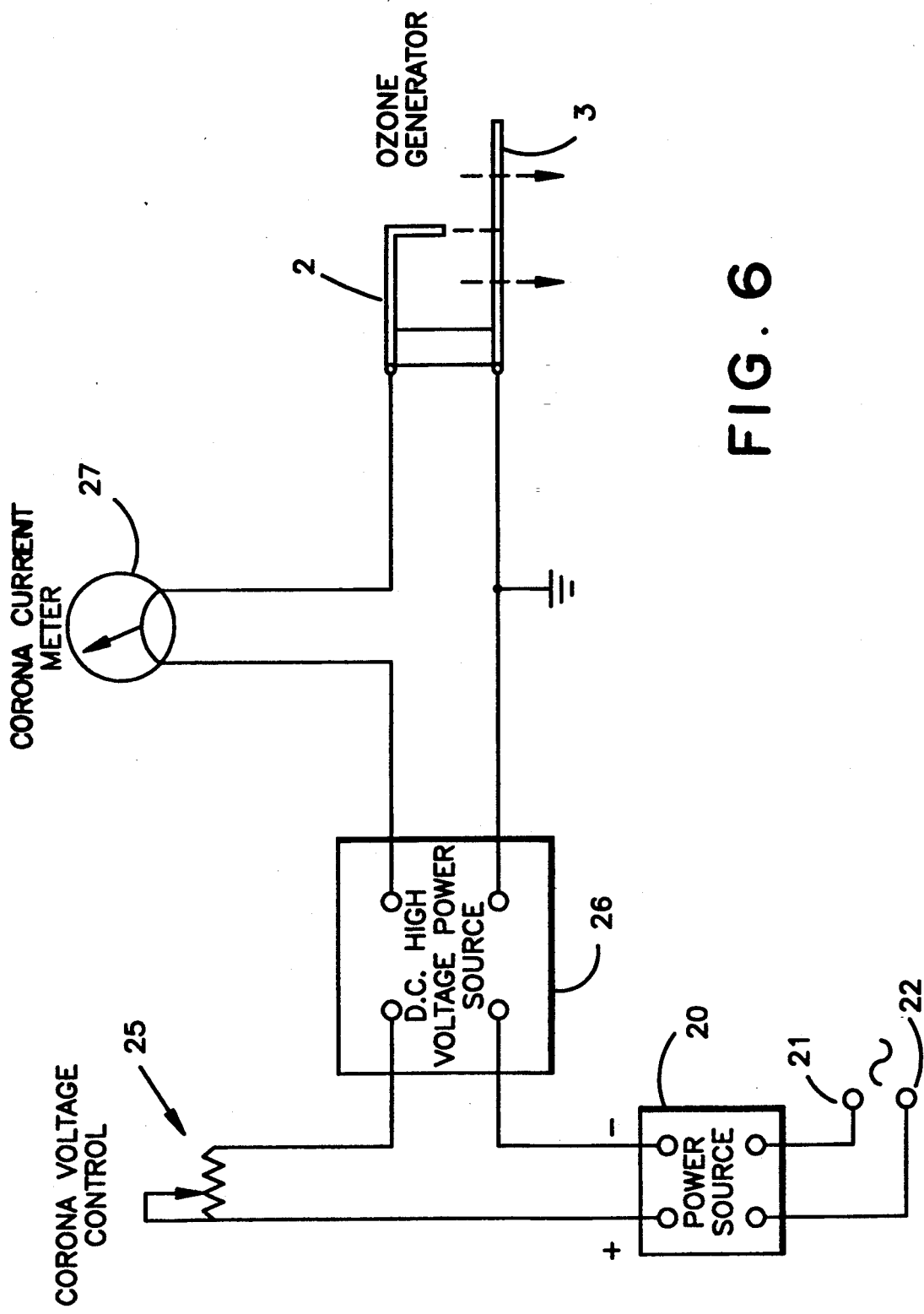
FIG. 6 is a simplified diagram of an ozone generator according to the invention connected to a suitable power supply.

FIG. 6 is a simplified diagram of the power supply. An AC to DC converter 20 is connected to an AC mains supply by terminals 21, 22. The DC output of converter 20 is fed via a corona voltage control 25 to a DC to DC converter 26 which determines the waveform and frequency shown in FIG. 5, and steps up the output from converter 20 to a high voltage level for application to the electrodes 2, 3 of the ozone generator. The voltage control 25, shown for simplicity as a rheostat, controls the amplitude of the high voltage output of converter 26 to control ozone production. Such electronic controls are well within the skill of persons skilled in the art. Corona current may be measured by a meter 27.

The apparatus described is intended for the treatment of small volumes of room air for the removal of odors. Since the ozone output of the apparatus is calibrated in terms of the readily measured corona current, this type of apparatus can be intelligently applied to odour control problems. If the volume to be treated is known, then the output in mg/hr necessary to produce ozone backgrounds of 0.04 ppm and below can be readily computed. Such concentrations are comparable to the natural background and generally acceptable for continuous human occupation.

What is claimed is:

1. An electrode structure for an ozone generator comprising an active electrode and a counter electrode, said electrodes each having terminal portions for connection to a high voltage DC source, said electrodes being mounted in spaced apart relation and insulated from one another, said active electrode having a tip portion with a blunt end face disposes at a predetermined distance from said counter electrode, the shape of said end face and its distance from said counter electrode being selected so that for a corona current of 100 $\mu$A the local current density at the tip is about $5 \times 10^{-2}$ A/cm$^2$.

2. An electrode structure as claimed in claim 1 wherein said blunt end face is in axial alignment with an aperture in said counter electrode.

3. An electrode structure as claimed in claim 2 wherein said blunt end is planar with rounded edges.

4. An electrode structure as claimed in claim 3 wherein said counter electrode is planar and said aperture is circular.

5. An electrode structure as claimed in claim 1 wherein said blunt end is rounded.

6. An electrode structure as claimed in claim 5 wherein said counter electrode has a single aperture in the form of a section of a hollow cylinder.

7. An electrode structure as claimed in claim 1 wherein said active electrode comprises a U-shaped rod having first and second ends each comprising a tip portion and said counter electrode comprises a screen.

8. An electrode structure as claimed in claim 5 wherein said active electrode is a wire, said counter electrode is a cylinder, and said wire is coaxially mounted within the cylinder with said blunt end spaced from an end aperture of the cylinder by a distance equal to about one half of the diameter of the tube.

9. An electrode structure as claimed in any one of claims 1 to 8 wherein the electrodes are made of titanium, stainless steel or gold.

10. An ozone generator comprising a high voltage DC source connected to an electrode structure as claimed in any one of claims 1 to 8 wherein said DC source repetitively provides a waveform which includes a brief high voltage to initiate corona discharge followed by a lower voltage for a longer period of time during which the corona discharge is stable, after which the voltage drops to substantially zero volts to terminate the corona discharge, said waveform being repeated at a repetition rate of 1000 to 50000 Hz, the mean voltage being a range of 5000 to 10000 volts.

11. An ozone generator as claimed in any one of claims 1 to 8 wherein said electrodes are insulated from each other by being mounted on an insulator of ceramic, porcelain or suitable plastic.

* * * * *